(12) United States Patent
Thomson et al.

(10) Patent No.: US 7,813,501 B2
(45) Date of Patent: Oct. 12, 2010

(54) MIDSPAN POWER DELIVERY SYSTEM FOR REDUCED EMISSIONS

(75) Inventors: Josh Thomson, Ottawa (CA); Edward Peter Gancarcik, Ottawa (CA)

(73) Assignee: Mitel Networks Corporation, Kanata, Ontario (CA)

( * ) Notice: Subject to any disclaimer, the term of this patent is extended or adjusted under 35 U.S.C. 154(b) by 1346 days.

(21) Appl. No.: 11/242,857

(22) Filed: Oct. 5, 2005

(65) Prior Publication Data

US 2007/0077819 A1   Apr. 5, 2007

(51) Int. Cl.
 *H04M 1/19* (2006.01)
(52) U.S. Cl. .................... 379/413.04; 333/25; 333/177; 379/399.01; 379/403; 379/413.02; 439/676
(58) Field of Classification Search ................. 361/780; 370/200, 352; 375/258; 379/413.03, 413, 379/399.01, 403, 413.02, 413.04; 455/572; 713/300; 324/522; 340/310.11, 999; 363/21.12; 702/188; 333/25, 177; 439/676
See application file for complete search history.

(56) References Cited

U.S. PATENT DOCUMENTS

| | | | |
|---|---|---|---|
| 5,994,998 | A | 11/1999 | Fisher et al. |
| 6,049,258 | A * | 4/2000 | Fawal et al. ................. 333/177 |
| 6,115,468 | A | 9/2000 | De Nicolo |
| 6,246,748 | B1 * | 6/2001 | Yano .............................. 379/2 |
| 6,329,906 | B1 * | 12/2001 | Fisher et al. ................. 375/258 |
| 6,480,122 | B1 * | 11/2002 | Oddy et al. .................. 340/999 |
| 6,486,747 | B1 * | 11/2002 | DeCramer et al. ............ 333/25 |
| 6,541,878 | B1 | 4/2003 | Diab |
| 6,640,308 | B1 * | 10/2003 | Keyghobad et al. ......... 713/300 |
| 6,798,769 | B1 * | 9/2004 | Farmwald ................... 370/352 |
| 6,956,462 | B2 * | 10/2005 | Jetzt ........................... 379/413 |
| 6,996,232 | B1 * | 2/2006 | Staber et al. ............ 379/413.02 |
| 7,006,625 | B2 * | 2/2006 | Rodriguez et al. .......... 379/403 |
| 7,027,595 | B2 * | 4/2006 | Miyazaki et al. ........ 379/413.04 |
| 7,030,733 | B2 * | 4/2006 | Abbarin .................. 340/310.11 |
| 7,038,918 | B2 * | 5/2006 | AbuGhazaleh et al. ...... 361/780 |
| 7,039,180 | B1 * | 5/2006 | Issaa et al. ............. 379/399.01 |
| 7,095,849 | B2 * | 8/2006 | Smith et al. ............ 379/413.04 |
| 7,099,463 | B1 * | 8/2006 | Karam ................... 379/413.03 |
| 7,110,533 | B2 * | 9/2006 | Cooke .................... 379/413.04 |

(Continued)

OTHER PUBLICATIONS

"Power Over Ethernet (PoE) Adapter DWL-P-50", http://www.dlink.com/products/?pid=368&sec=0, Jul. 15, 2005.

(Continued)

*Primary Examiner*—Gerald Gauthier (57) ABSTRACT

A midspan power adapter is provided for use in a balanced communication system, such as an Ethernet system, where differential signals are transmitted between two devices. The adapter passes data signals through, and provides power to an end device, such as an IP phone, with significantly less contribution to the electromagnetic emissions of the system than known midspan adapters. Balance and symmetry inherent in a structured cable can be maintained by a termination network connecting center taps of a transformer and the spare pairs of both the incoming and outgoing cables to a common point. The adapter can provide power through unused wires (known as spare pair power) or by combining power with data signals (known as phantom feed). A common mode choke is included in the power feed to prevent noise currents from flowing through the power supply connections to earth ground, helping to minimize radiated noise.

10 Claims, 6 Drawing Sheets

U.S. PATENT DOCUMENTS

| | | | |
|---|---|---|---|
| 7,225,345 B2 * | 5/2007 | Korcharz et al. | 713/300 |
| 7,421,290 B2 * | 9/2008 | Lehr et al. | 455/572 |
| 7,475,264 B2 * | 1/2009 | Bell | 713/300 |
| 7,480,233 B2 * | 1/2009 | Binder | 370/200 |
| 2003/0012365 A1 * | 1/2003 | Goodman | 379/413.02 |
| 2003/0096537 A1 * | 5/2003 | Belopolsky | 439/676 |
| 2004/0174251 A1 * | 9/2004 | Fisher et al. | 340/310.01 |
| 2004/0239465 A1 | 12/2004 | Chen et al. | |
| 2006/0015299 A1 * | 1/2006 | McDermott et al. | 702/188 |
| 2006/0244462 A1 * | 11/2006 | McCosh et al. | 324/522 |
| 2007/0019445 A1 * | 1/2007 | Blaha et al. | 363/21.12 |

OTHER PUBLICATIONS

"Power Over Ethernet (PoE) Adapter DWL-P-50", Data Sheet, http://www.dlink.com/products/?pid=368&sec=0; Jul. 15, 2005.

"Power Over Ethernet Adapter DWL-P100", http://www.dlink.com/products/?pid=48&sec=0; Oct. 5, 2005.

"Power Over Ethernet Adapter DWL-P100", Data Sheet, ftp://ftp10.dlink.com/pdfs/products/DWL-P100/DWL-P100_ds.pdf; Jul. 15, 2005.

"Express EtherNetwork Power Over Ethernet PoE Adapter DWL-P200", http://www.dlink.com/products/?pid=332&sec=0, Jul. 15, 2005.

"Express EtherNetwork Power Over Ethernet PoE Adapter DWL-P200", Data Sheet, ftp://ftp10.dlink.com/pdfs/products/DWL-P200/DWL-P200_ds.pdf; Jul. 15, 2005.

"Single Port 15.4W Power Over Ethernet Adapter PSA16U IEEE 802.3af Compliant", http://www.phihong.com/html/psa-16u.html; Jul. 15, 2005.

"Single Port 15.4W Power Over Ethernet Adapter PSA16U IEEE 802.3af Compliant", Data Sheet, http://www.phihong.com/assets/pdf/PSA16U.pdf; Jul. 15, 2005.

* cited by examiner

MIDSPAN POWER DELIVERY SYSTEM FOR REDUCED EMISSIONS

FIELD OF THE INVENTION

The present invention relates generally to power delivery over signal lines. More particularly, the present invention relates to a midspan power delivery system, or power adapter.

BACKGROUND OF THE INVENTION

Internet telephony, also known as Voice over IP (Internet Protocol), or VoIP, is the routing of voice conversations over the Internet or any other IP network. In VoIP, voice data flows over a general-purpose packet-switched network, instead of the conventional dedicated, circuit switched voice transmission lines used with conventional telephony, also known as plain old telephone service (POTS).

Telephones require electrical power to operate. In POTS, a combined voice signal and power signal is transmitted over twisted pair cable between a telephone and a line card at a public telephone exchange. Unlike POTS, where the voice signal and power signal are combined and require only two wires, Ethernet uses four pairs. In a 10Base-T (10 Mbps) or 100Base-T (100 Mbps) Ethernet system one pair is used for the transmit signal, a second pair carries the receive signal and there are two unused or spare pairs. To provide a similar ease of use for VoIP phones as for conventional phones, configurations have arisen that provide power to a VoIP phone from a power source over an Ethernet connection. Power over Ethernet (PoE), or IEEE standard reference 802.3af, allows the electrical power necessary for the operation of a powered device to be carried by data cables rather than by separate power cords. This minimizes the number of wires that must be used in order to install the network and eliminates the need for AC outlets and AC/DC adapters for each powered device, resulting in lower cost, easier maintenance and greater installation flexibility.

There are two main types of PoE devices: endspan and midspan. An endspan device is generally a network switch that transmits the data signal and provides power. It resides at the end of a link. Endspan devices can provide power in either of two ways: "phantom" feed devices provide power over the active or signal (transmit and receive) wire or line pairs; or power can be sourced on the unused or spare pairs. A midspan device fits in between a switch and a powered device, and can be mounted adjacent to the Ethernet switch in an equipment rack or located near the peripheral end device such as an IP Phone. A midspan device, or power adapter, typically supplies power on the unused wire pairs and simply passes the data signal through without modification—it does not include any transmit or receive functionality. A midspan power adapter is typically a stand-alone device, making it suitable for use with a network switch that does not support PoE. Furthermore, since midspans are less expensive than endspans, midspans are a cost-effective way of adding PoE on a port by port basis to an existing network. As such, IP phones are conventionally powered by a midspan power adapter where adding endspan PoE devices is cost prohibitive.

Figure 1:
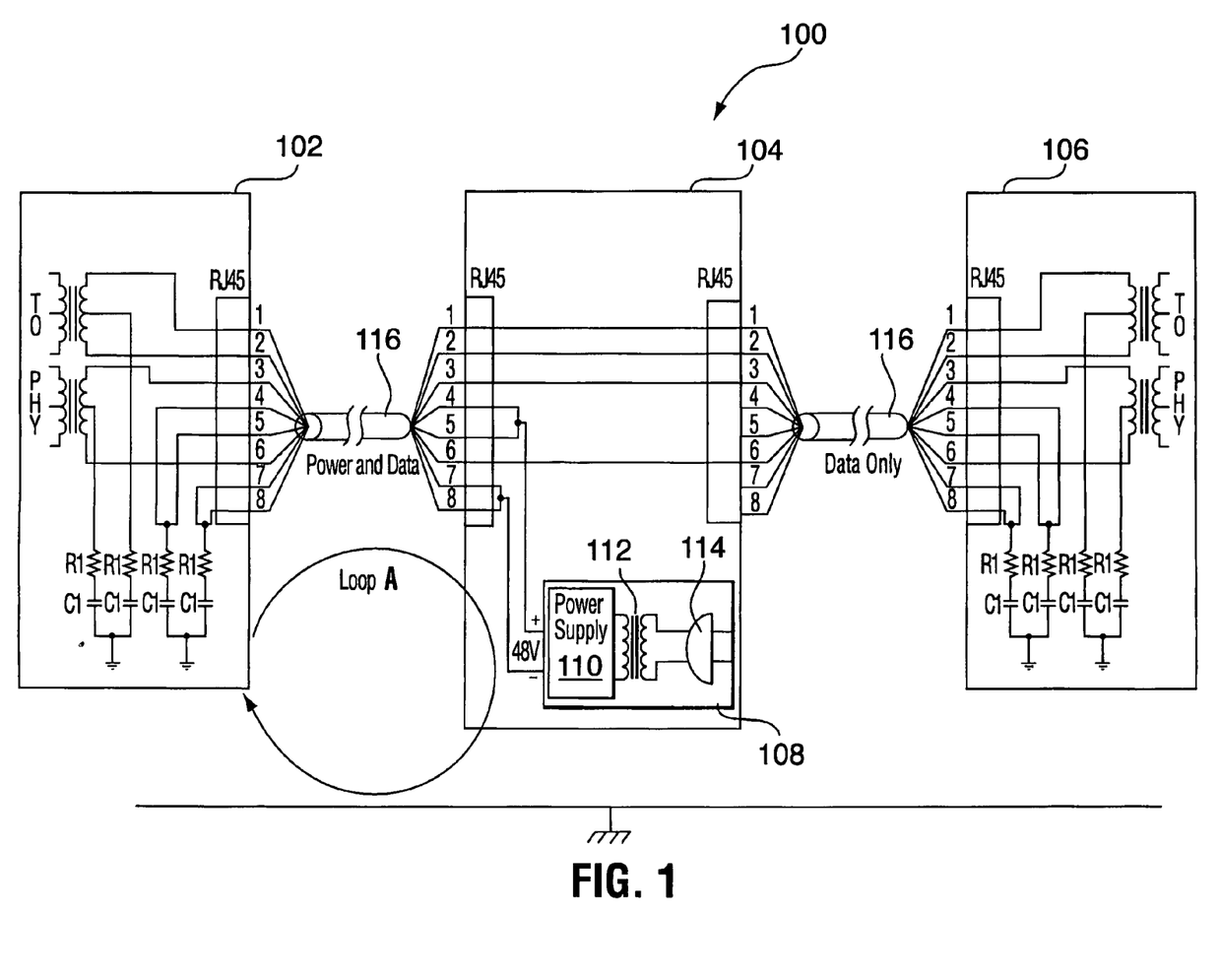
FIG. 1 illustrates an internet phone system including a midspan power adapter.

FIG. 1 illustrates a system 100 in which a conventional IP phone 102 is coupled to a known midspan power adapter 104, which is in turn coupled to a network switch 106. The midspan power adapter 104 includes, or is otherwise connected to or in electrical communication with, a power source 108. The power source 108 in FIG. 1 is connected between device connector wire pairs 4,5 and 7,8. The power source 108 is typically 48 volts DC, and can comprise one or more batteries, or an uninterruptible power supply (UPS). More typically, and as shown in FIG. 1, the power source comprises an AC adapter which can plug into a typical wall outlet. The AC adapter can include a power supply 110, a transformer 112, and a wall plug 114. Connection between the IP phone 102, the midspan power adapter 104, and the network switch 106 is conventionally enabled by cabling 116, such as Category 5, or CAT5, cabling. Different categories of cabling can be used for different equipment, such as 10/100/1000 Mbps Ethernet, also known respectively as 10/100/1000 Base-T, with 1000 Mbps Ethernet also being known as Gigabit Ethernet.

Midspan power adapters typically feed the signal wires directly through a first set of wires, identified as wires 1 to 3 and 6 in FIG. 1. Power is injected on the phone (or powered device) side from the power source 108 via spare pairs, shown as pairs 4,5 and 7,8 in FIG. 1. On the switch side, the spare wires are usually unterminated. Cutting the spare pairs to insert power, and not properly terminating the pairs significantly changes the common mode impedance between each pair within the cable. This discontinuity alters the balance and symmetry of the cable, causing an increase in radiated emissions when a midspan power adapter is used with an IP phone. Thus the powered device may exceed emission limits when in operation. The design intent for powered Ethernet devices, such as IP phones, is to have minimal electromagnetic emissions. Discontinuities such as those encountered in midspan PoE adapters can significantly elevate emission levels.

It is possible to provide power to an end device without breaking or cutting the spare pairs inside the midspan power adapter. However, there is no way of knowing what the spare pairs are connected to at the network switch 106. For example, if a resistive load is attached at the network switch 106, placing power on the spare pair could destroy the load. For this reason, a break in the spare pairs is generally provided in a midspan power adapter. Unfortunately, this break also causes an increase in the amount of radiated energy.

Several methods exist for containing unwanted emissions. One approach is to add a common mode filter clamp on an Ethernet cable to be used with a powered device. This involves customers placing chokes on cables which often does not occur, and makes cable management difficult since the chokes can be bulky. Alternatively, a choke could be moulded onto the cable, but this can be costly and standard replacement cables cannot be used. Another approach is to add common mode chokes within the powered device either as discrete parts or embedded into the Ethernet connectors. A further approach is to use shielded cable throughout any links containing a midspan power adapter. Shielded cable, however, is more expensive and not as commonly used as the Unshielded Twisted Pair Category 5 Ethernet cable specified for use with IP Phones today. Rewiring a building tends to be cost prohibitive.

In general, these approaches merely add extra filtering and cost to each IP phone, rather than fixing the source of the problem. The problem lies in the midspan power adapter and the radiated energy it causes.

It is, therefore, desirable to provide a midspan power adapter that can power an IP device without adding significant radiated energy to the system.

SUMMARY OF THE INVENTION

It is an object of the present invention to obviate or mitigate at least one disadvantage of previous midspan power adapters for use with a powered device, end device or IP device.

This invention provides a midspan PoE adapter with reduced emission levels when compared with conventional implementations of midspan PoE adapters.

In a first aspect, the present invention provides a midspan power adapter to power a powered device in a balanced cable system. The power adapter has a device side including device connectors and a system side including system connectors, as well as a power source provided between two spare pairs of the device connectors. The adapter includes a common mode choke connected inline between the power source and the spare pairs of the device connectors. The adapter also includes a transformer to isolate the device connectors and the system connectors. The transformer has device side terminals connected to signal pairs of the device connectors and system side terminals connected to signal pairs of the system connectors. The transformer also has first center taps and second center taps. The adapter further includes a termination network connected between non-signal connectors and a common point to provide common mode termination. The adapter also includes a common mode choke connected to the termination network to provide power from the power source to a pair of device connectors.

In an embodiment, the non-signal connectors include the first center taps of the transformer, spare pairs of the device connectors and spare pairs of the system connectors. The adapter can further include a phantom power common mode choke to provide power from a power supply to the second center taps on the transformer. In another embodiment, the non-signal connectors include the second center taps of the transformer, in which case the termination network terminates the first and second center taps to a common point. The common mode choke can be connected to a spare pair of device connectors. The termination network can include a plurality of common mode terminations each having substantially similar resistance and capacitance values. The resistance values can be determined in accordance with pair-to-pair common mode impedance within a connector cable. The termination network can include a Bob Smith Termination. The termination network can include a first termination network for terminating the end device connectors and system connectors, and a second termination network for terminating the first center taps. The transformer can be a 1:1 isolation transformer, the balanced cable system can be an Ethernet system, and the powered device can be an internet protocol (IP) device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a midspan power adapter for use in a balanced communication system, such as an Ethernet system, where differential signals are transmitted between two devices. The adapter of the invention passes data signals through, and provides power to an end device, such as an IP phone, with significantly less contribution to the electromagnetic emissions of the system than conventional midspan adapters. The adapter of the invention can provide power through separate unused wires (known as spare pair power in Ethernet systems) or by combining power with data signals (otherwise known as phantom feed). A common mode choke is included in the power feed to prevent noise currents from flowing through the power supply connections to earth ground, helping to minimize radiated noise. The midspan power adapter also includes a transformer having first and second center taps. Using proper common mode terminations to a common point from the center taps and the spare pairs of both the incoming and outgoing cables, the balance and symmetry inherent in a structured cable, such as those found in Ethernet communication systems, can be maintained. Maintaining this balance and symmetry reduces the amount of wanted differential signal energy that is converted to common mode energy which leads to radiated emissions.

A common mode signal is, strictly speaking, the average of the signals present at the two inputs of a differential amplifier. A common mode signal also refers to the voltage level present at both inputs of a differential amplifier, as if they were tied together. Common mode impedance is an impedance seen when testing into a pair of lines driven by identical (common) signals.

The present invention provides an enhancement to current implementations of a Midspan Power Over Ethernet Adapter. It can be used in a balanced system, such as a 100 Base-T or Gigabit Ethernet system. Current midspan adapters cause significant energy to be radiated off of an attached Ethernet cable carrying data signals. A midspan power adapter according to the present invention assists in meeting emission limits for any powered device, such as an IP Phone, connected to the adapter. The emission limits can be defined by IEC CISPR 22 Class B, or similar requirements such as FCC Class B. Integrating the solution directly into a Midspan Power Over Ethernet Adapter shifts the cost from the powered device (IP Phone) to the Adapter, which is the source of the problem.

To reduce the amount of energy being radiated by a cable carrying 100 Base-T signaling, the amount of common mode current carried on the cable can be reduced. A midspan power device of the present invention maintains cable symmetry and balance by properly terminating both the incoming and outgoing cables within the adapter, and adds common mode impedance to the power feed. Current solutions simply leave the spare pairs on the incoming cable floating, or unterminated, and do not properly maintain the common mode impedance between each pair; a part of the intended differential mode signal on the cable is thus converted to common mode energy, which leads to increased radiated energy.

The present invention also provides midspan power in a novel manner. A galvanic device, such as a transformer, is included in the midspan power adapter to maintain isolation and supply power to the powered device without presenting power to the network switch or the rest of the network. The transformer provides power and maintains isolation, while at the same time maintaining signal integrity within the cable, without adding radiated noise. While it is presently believed that a transformer provides the best isolation, diodes or capacitors can also be used. The transformer is preferably a transformer having a one-to-one winding ratio. Other transformer winding ratios can be used, but such a change would affect the Ethernet signal and would not provide maximum power transfer as will a winding ratio of 1 to 1. A different transformer winding ratio can be used in order to compensate for a mismatch, such as an impedance mismatch.

The present invention counterintuitively addresses an electromagnetic compatibility (EMC) issue. Intuitively, a designer would not add another component to the adapter, as it would adversely affect the main data signal. Clearly, adding a transformer in the midspan power adapter adds an insertion loss. This added insertion loss can reduce the maximum cable length, or span, between the powered device and the system. However, unexpectedly, the radiated emissions are minimized.

While there are some known approaches that claim a device is FCC (or IEC) Class B compliant, those compliance tests generally only test the power supply, and do not include putting 100 Mbps Ethernet signaling through the adapter during the test. The present invention is meant to address the energy radiated due to the Ethernet signaling passing through the adapter.

One known approach deals with the coupling of power with a data signal using a transformer. However, that approach does not use common mode terminations on the center taps of the transformer, and does not return common mode currents to a common reference point. This does not consider the problem of radiated emissions. Moreover, the configuration results in discontinuities, which are addressed by the present invention. Known midspan devices do not provide proper common mode terminations of spare pairs with respect to signal pairs for maintaining low levels of radiated emissions.

Figure 2:
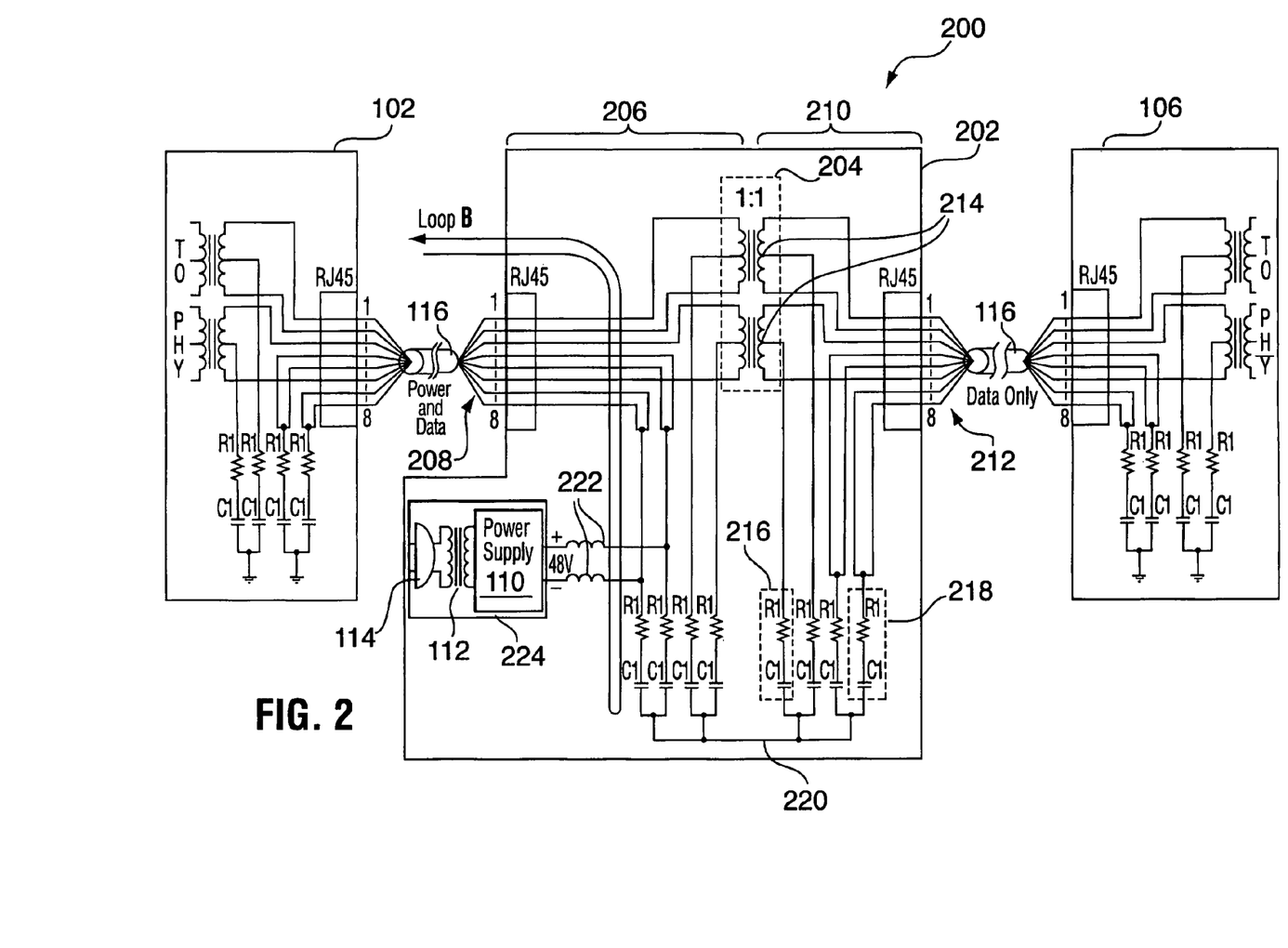
FIG. 2 illustrates an internet phone system including a midspan power adapter according to an embodiment of the present invention.

FIG. 2 illustrates an internet phone system 200, including a midspan power adapter 202 according to an embodiment of the present invention. The phone 102, network switch 106 and cabling connections 116 in FIG. 2 are generally similar to those shown in FIG. 1. In the new adapter 202, a transformer 204, such as a 1:1 isolation transformer, is used to pass a data signal, such as a 100 Base-T signal. The transformer 204 logically separates the midspan power adapter into two separate cables or sides: a device side 206 having device connectors 208, and a system side, or switch side, 210 having system connectors 212. Signal pairs of the device connectors are connected to device side terminals of the transformer, and signal pairs of the system connectors are connected to system side terminals of the transformer. The logical separation into two separate sides permits proper consideration of balancing and symmetry of the cable. Balance and symmetry help to control radiated emissions when the midspan power adapter is used with an IP phone.

Rather than feeding the signal pairs straight through, center taps 214 of the transformer 204 are used to properly terminate signal pairs from a common mode perspective via a first termination network 216, in order to maintain the impedance between signal pairs and spare pairs. The spare pairs are also connected to a common mode termination via a second termination network 218, such as a DC blocking capacitor and a resistor. All terminations for both incoming and outgoing cables are preferably connected to a common point 220.

Although the termination networks 216 and 218 are discussed separately in order to distinguish the points that they connect together, the termination networks themselves are generally the same as each other, as illustrated in FIG. 2. Considering both termination networks as a single termination network, it can be described as being connected between non-signal connectors and a common point to provide common mode termination. The non-signal connectors can include first center taps of the transformer, spare pairs of the device connectors and spare pairs of the system connectors.

The center taps 214 can also be referred to as first and second center taps, as they will be in another embodiment. In the embodiment of FIG. 2, the termination network terminates both the first center taps and second center taps to the common point 220.

The first and second termination networks 216 and 218 preferably have substantially similar resistance and capacitance values. Keeping all resistors at substantially similar values provides the desired symmetric impedance between pairs, and improves cable balance over current implementations. Resistor values can be determined in accordance with the pair-to-pair common mode impedance within the cable. The selection of resistor values can be determined in accordance with the Bob Smith Termination technique described in U.S. Pat. No. 5,321,372 issued on Jun. 14, 1994 and entitled "Apparatus and method for terminating cables to minimize emissions and susceptibility", which is incorporated herein by reference. Variations on that technique are described in "Updating the Bob Smith Termination Technique", by Jim Satterwhite of Teltest Electronic Laboratories at http://www-.commsdesign.com/design_corner/showArtide.jhtml?articleID=19300046, which is also incorporated herein by reference. Different types of cable require different termination resistor values. The invention described herein can be used with other types of cable (such as Category 6 cable) by selecting appropriate resistor values.

By providing termination networks 216 and 218, noise currents are contained within the cable. The present invention sends noise back to its source so that it forms the smallest loop area (Loop B in FIG. 2), i.e. its antenna size is minimized. If a noise signal is allowed to radiate over a large loop (Loop A in FIG. 1), the result is a large antenna. This is the result when antenna pairs, or wire pairs, are broken such as shown in FIG. 1. The return path for noise currents in a system as in FIG. 1 is via earth ground. The transformer configuration according to an embodiment of the present invention in FIG. 2 maintains the symmetry and coupling of the Ethernet signal within the cable itself.

Power is added to the spare pair on the outgoing cable through a common mode choke 222. This power is typically from a power source 224, such as a DC power source suitable for powering a powered device, such as an IP phone. In Ethernet applications, a 48 Volts DC power source is often employed. Variations in implementation of the power source 224 are similar to those of the previously described power source 108. The common mode choke 222 contains the noise currents within the Ethernet cable rather than having them flow through the power supply connection to earth ground. This essentially reduces the effective area of radiation. Also, without a common mode choke, connecting the power source, or power supply, across the spare pairs causes the common mode impedance between those pairs to be much lower than desired. The common mode choke 222 in the power feed looks like a high impedance, making the termination impedance the low impedance common mode path between the pairs. This restores a symmetric common mode impedance between the pairs which reduces the conversion of desired differential signal (data) energy into common mode energy.

In other words, an embodiment of the present invention provides a midspan power adapter to power a powered device in a balanced cable system. The power adapter has a device side including device connectors and a system side including system connectors, as well as a power source provided between two spare pairs of the device connectors. The adapter includes a transformer to isolate the device connectors and the system connectors. The transformer has device side terminals connected to signal pairs of the device connectors and system side terminals connected to signal pairs of the system connectors. The adapter also includes a termination network that is connected between non-signal terminals of both the transformer and the connectors and a common point, to provide common mode termination. The adapter also includes a common mode choke connected inline between the power source and the spare pairs of the device connectors. The non-signal terminals can include center taps of the transformer, spare pairs of the device connectors and spare pairs of the system connectors.

Figure 3:
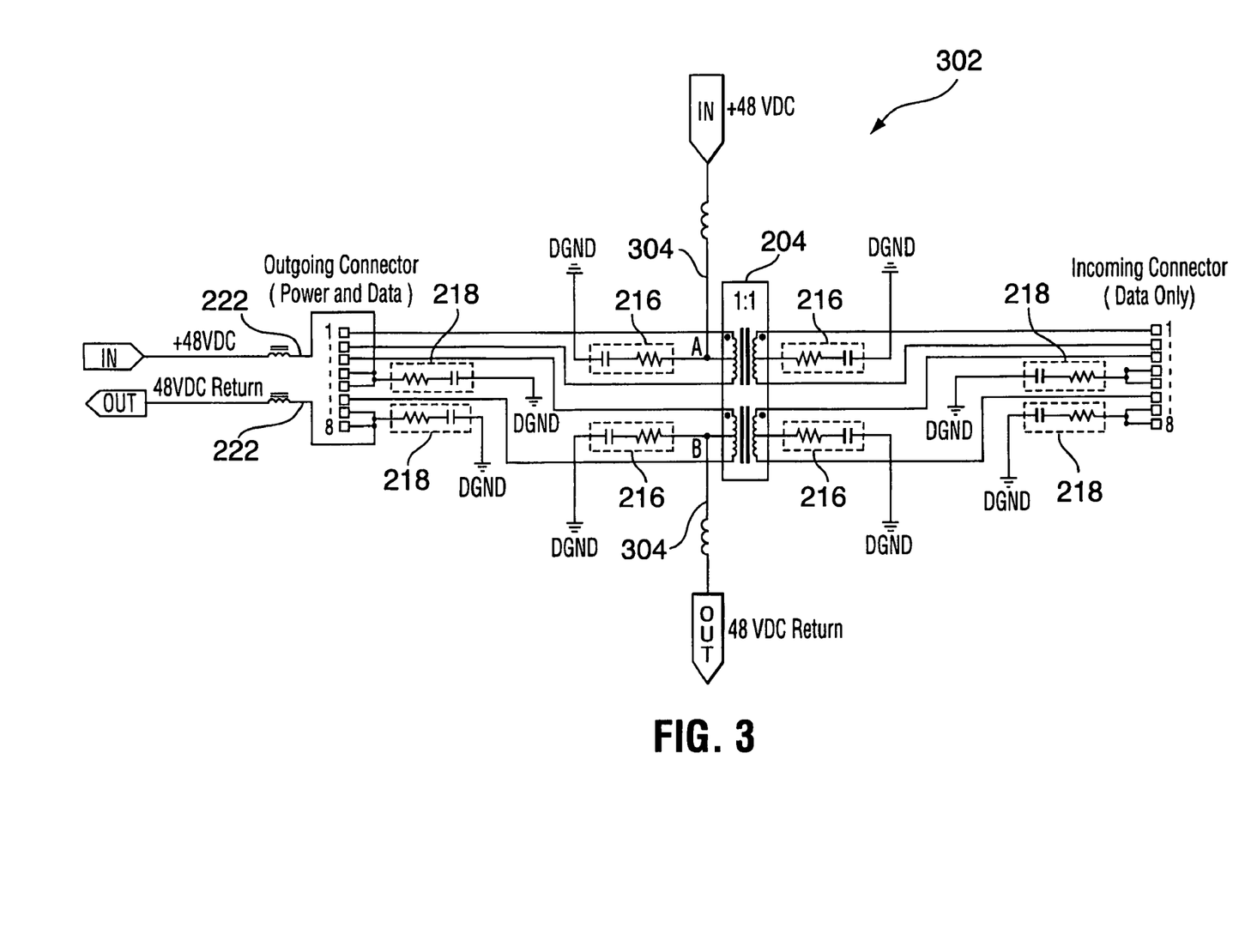
FIG. 3 illustrates a midspan power adapter according to another embodiment of the present invention.

Power can be fed to the midspan power adapter via the spare pairs or via the center taps. In the embodiment of FIG. 2, power is shown as being provided across the spare pairs on the phone or device side of the midspan power adapter. Feeding power into the center taps of the transformer, on the differential pairs to the end device, is also known as a phantom feed. FIG. 3 illustrates a midspan power adapter according to another embodiment of the present invention. Providing power via phantom feed, as illustrated in FIG. 3, has not been done in the past because it requires a transformer which adds cost and reduces the transmission range slightly by adding some insertion loss in the link. In this case the spare pairs are left connected together through the adapter and the supply voltage only appears on the end device side of the transformer.

The midspan power adapter 302 shown in FIG. 3 includes means to feed power to the spare pairs (as in FIG. 2) and means to feed power via the center taps, i.e. phantom feed. The network or system side center taps that remain only connected to the common point can be referred to as first center taps. This embodiment includes a phantom power common mode choke 304 to provide power from a power supply to second center taps, or phantom power center taps, of the transformer. The phantom power common mode choke 304 is provided in addition to the existing termination network. The remaining components and connections in FIG. 3 are substantially similar to FIG. 2, and reference is made to the description of FIG. 2 for further information.

Figure 4:
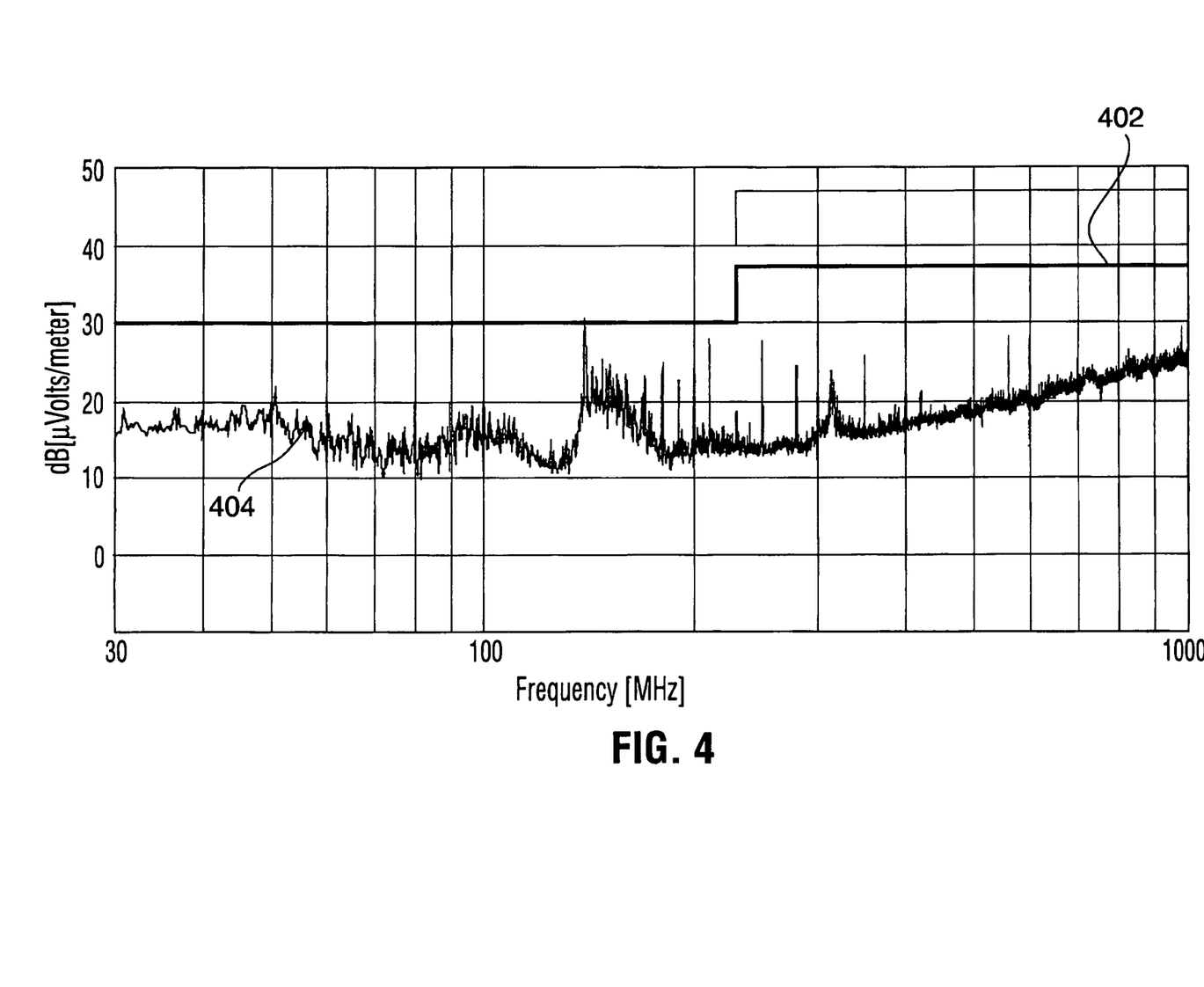
FIG. 4 is a frequency plot of radiated emissions from an internet phone system powered from an endspan device (no midspan adapter)

FIG. 4 is a frequency plot of radiated emissions for an internet phone powered from an endspan power system using phantom feed. Since there is no midspan device in this arrangement, there is no emissions contribution associated with midspan devices. The measurements were taken with a biconical log antenna in the vertical orientation. For reference, the CISPR22 Class B boundary 402 is highlighted. The frequency range of interest is from 50 MHz to 150 MHz where a spectrum of the MLT-3 coding used in 100 Mbps Ethernet signaling resides. (The peak in the range of 100-200 MHz is an unrelated issue and will not be discussed herein.) The illustration in FIG. 4, particularly radiated emissions plot 404, is provided as a reference to show the level of emissions the phone can achieve.

Figure 5:
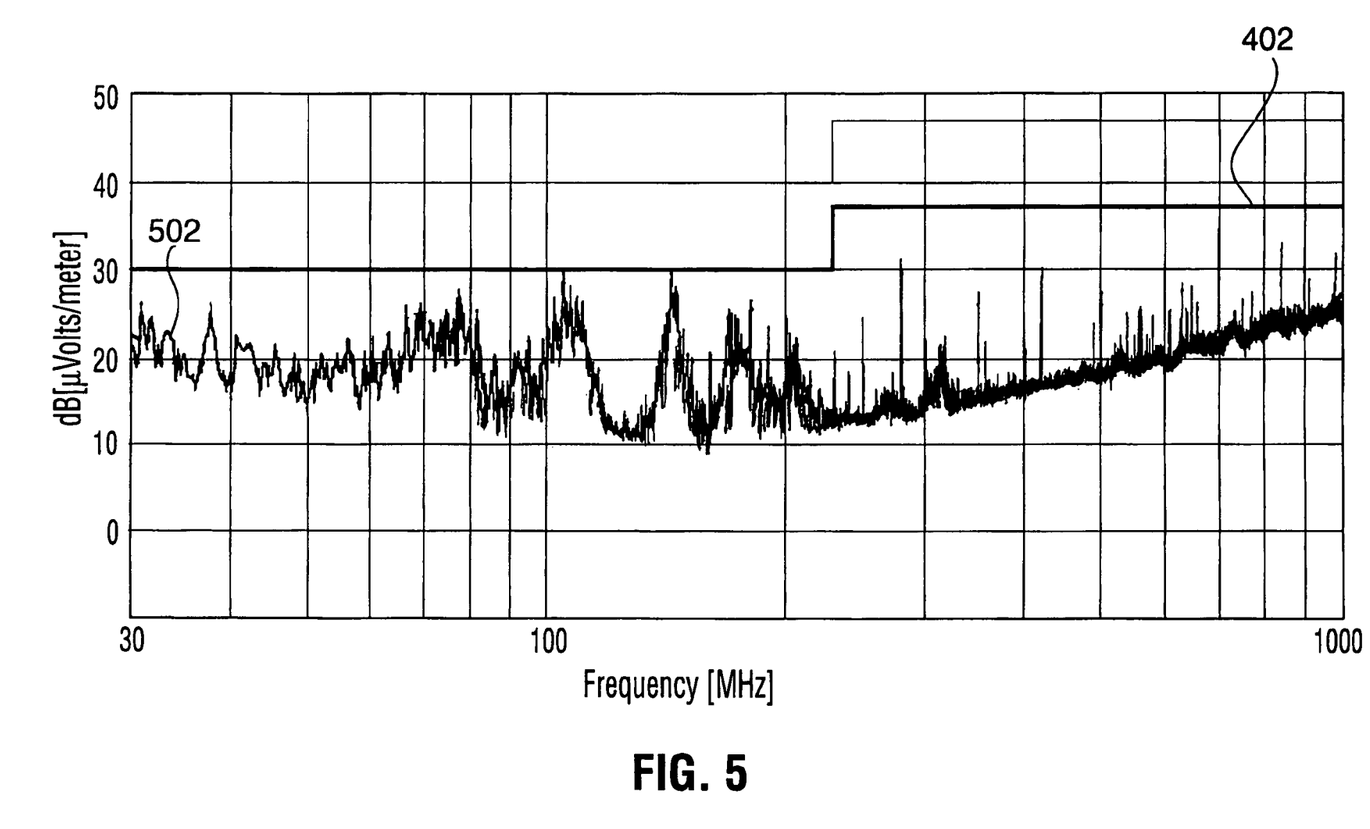
FIG. 5 is a frequency plot of radiated emissions from an internet phone system including a conventional midspan power adapter.

FIG. 5 illustrates a frequency plot 502 of radiated emissions from the same IP phone as in FIG. 4, but this time powered from a conventional midspan power adapter, rather than an endspan power system. Again, the Class B boundary 402 is shown for reference in FIG. 5. The radiated emissions from 50 to 150 MHz in FIG. 5 are generally much higher than with the phone powered by an endspan device as in FIG. 4.

Figure 6:
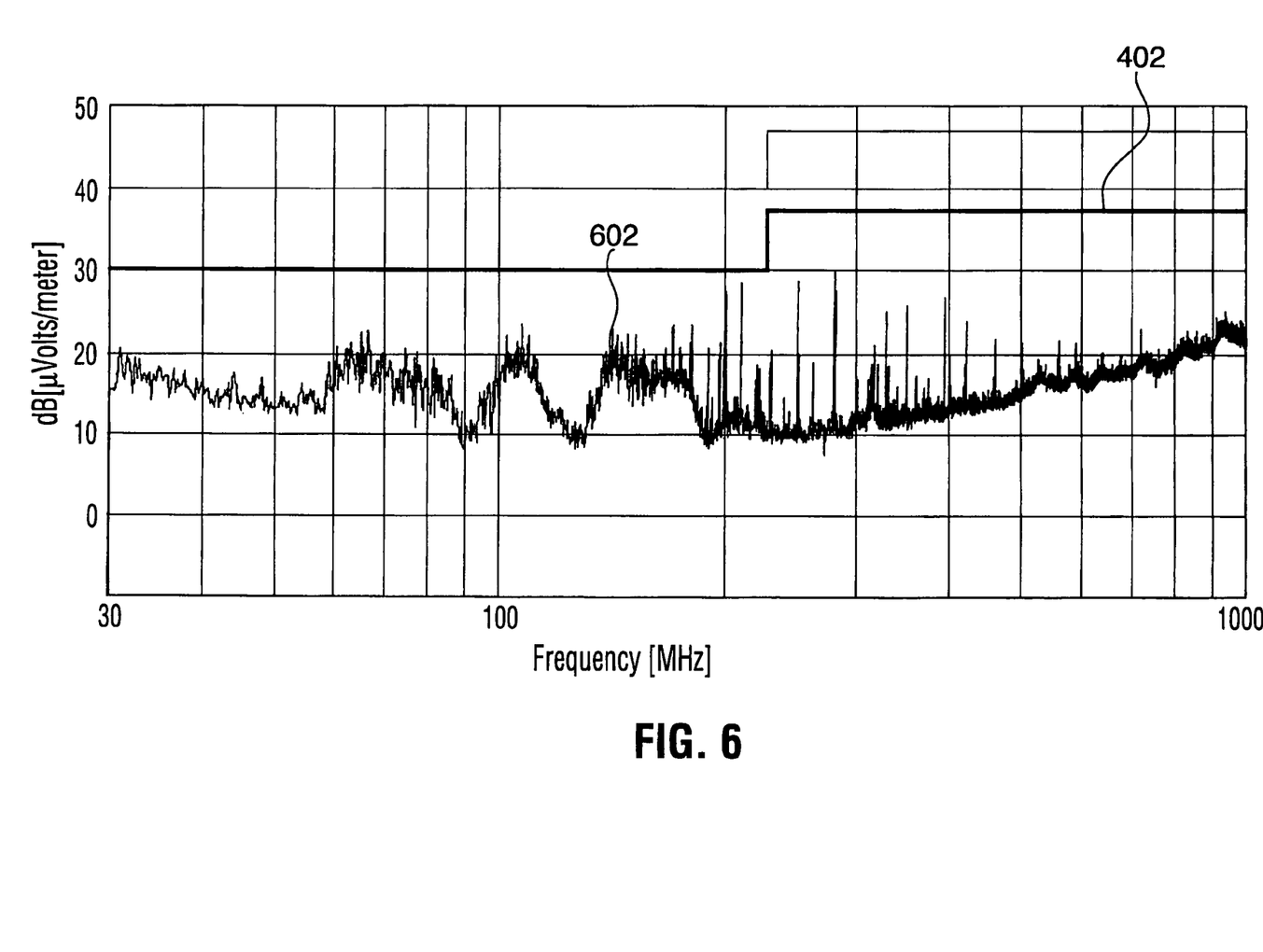
FIG. 6 is a frequency plot of radiated emissions from an internet phone system including a midspan power adapter according to an embodiment of the present invention.

FIG. 6 is a frequency plot of the same phone as in FIG. 4, this time powered from a midspan power adapter according to an embodiment of the present invention. Again, the measurements were taken with the antenna in the vertical configuration. Emitted radiation for this configuration is shown as 602, and the Class B boundary 402 is again included for reference. Comparing the emission levels between 50 and 150 MHz, the results in FIG. 6 are nearly as good as the "baseline" case of FIG. 4. While the system in FIG. 6 includes an IP phone and a midspan power adapter according to an embodiment of the invention, the system in FIG. 4 includes an IP phone powered from an endspan device (i.e. no midspan contribution). The emission results in FIG. 6 are significantly improved over the results from implementation of a conventional midspan adapter, as shown in FIG. 5. Improvements can be observed with respect to lower emission energy when viewed as a whole, as well as with respect to the peaks being farther away from the limit lines.

There is a tradeoff of reduced maximum cable span between the powered device and the network switch, since adding a transformer in the Ethernet link will add some small insertion loss. However, a system according to the invention reduces emissions when compared with conventional midspan power systems, and removes the need to provide power over separate wires to the powered device.

The midspan power adapter of the present invention can be used with any Ethernet device. Examples include a wireless base station or Ethernet base station. Midspan power adapters are popular in the home-office or tele-working environment.

Embodiments of the present invention can be used in connection with 100-base-T Ethernet as well as with Gigabit Ethernet. The embodiment shown in FIG. 2 is provided for use with a 100 MB Ethernet. In a Midspan Power Over Ethernet Adapter for Gigabit Ethernet applications, all four pairs are preferably routed through the transformer, and all center taps are terminated in the same manner as center taps A and B in FIG. 3.

Although a single port midspan power adapter has been described and illustrated herein, embodiments of the present invention can be implemented as a multiport midspan power adapter as will be apparent to one of ordinary skill in the art.

The midspan power adapter of the present invention can be used with any balanced cable system, including Ethernet, with the resistor values in the termination networks chosen to provide appropriate impedance. The embodiments of the present invention can be used with a balanced system wherein a differential signal is transmitted. By powering the system, the symmetry of the common mode impedance between pairs is broken by the power injecting product. Examples of non-Ethernet balanced systems include RS 422 and RS 485.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A midspan adapter to power a powered device in a balanced cable system, the power adapter having a device side including device connectors and a system side including system connectors, and a power source provided between two spare pairs of the device connectors, the adapter comprising:

a common mode choke connected inline between the power source and the spare pairs of the device connectors;

a transformer to isolate the device connectors and the system connectors, the transformer having device side terminals connected to signal pairs of the device connectors and system side terminals connected to signal pairs of the system connectors, and having first center taps and second center taps; and a termination network connected between non-signal connectors and a common point to provide common mode termination.

2. The midspan power adapter of claim 1 wherein the non-signal connectors comprise the first center taps of the transformer, spare pairs of the device connectors and spare pairs of the system connectors.

3. The midspan power adapter of claim 2 wherein the non signal connectors further comprise the second center taps of the transformer.

4. The midspan power adapter of claim 1 further comprising a phantom power common mode choke to provide power from a power supply to the second center taps on the transformer.

5. The midspan power adapter of claim 1 wherein the termination network includes a plurality of common mode terminations each having substantially similar resistance and capacitance values.

6. The midspan power adapter of claim 1 wherein the termination network includes a Bob Smith Termination.

7. The midspan power adapter of claim 5 wherein the resistance values are determined in accordance with pair-to-pair common mode impedance within a connector cable.

8. The midspan power adapter of claim 1 wherein the transformer is a 1:1 isolation transformer.

9. The midspan power adapter of claim 1 wherein the balanced cable system is an Ethernet system.

10. The midspan power adapter of claim 1 where the end device is an internet protocol (IP) device.

* * * * *